(12) United States Patent
Hearty

(10) Patent No.: US 10,380,540 B2
(45) Date of Patent: Aug. 13, 2019

(54) SYSTEMS AND METHODS FOR MANAGING INVENTORY USAGE

(71) Applicant: Level 3 Communications, LLC, Broomfield, CO (US)

(72) Inventor: John Henry Hearty, Golden, CO (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

(21) Appl. No.: 14/168,437

(22) Filed: Jan. 30, 2014

(65) Prior Publication Data

US 2014/0214634 A1 Jul. 31, 2014

Related U.S. Application Data

(60) Provisional application No. 61/759,222, filed on Jan. 31, 2013.

(51) Int. Cl.
*G06Q 10/08* (2012.01)
(52) U.S. Cl.
CPC .................. *G06Q 10/087* (2013.01)
(58) Field of Classification Search
CPC ..... G06Q 10/087; G06F 21/31; G06F 9/5027; G06K 17/00
USPC .......... 705/28, 29, 59; 726/31, 15; 713/202; 700/106
See application file for complete search history.

(56) References Cited

U.S. PATENT DOCUMENTS

| | | | |
|---|---|---|---|
| 6,341,271 B1* | 1/2002 | Salvo ............... | G06Q 10/087 705/28 |
| 6,345,259 B1* | 2/2002 | Sandoval ............. | 705/7.11 |
| 7,797,204 B2* | 9/2010 | Balent ............. | 705/28 |
| 8,321,302 B2* | 11/2012 | Bauer ............ | G06K 7/0008 705/22 |
| 2002/0082735 A1* | 6/2002 | Wallace ............. | G06K 17/00 700/106 |
| 2004/0221179 A1* | 11/2004 | Seshadri ............. | 713/202 |
| 2004/0230841 A1* | 11/2004 | Savini ............. | G06F 21/31 726/15 |
| 2007/0038323 A1* | 2/2007 | Slocum et al. ........ | 700/99 |
| 2007/0156379 A1* | 7/2007 | Kulkarni et al. ....... | 703/14 |
| 2007/0162360 A1* | 7/2007 | Congram ............. | G06Q 10/087 705/28 |
| 2008/0004997 A1* | 1/2008 | Slocum et al. ........ | 705/28 |
| 2008/0177756 A1* | 7/2008 | Kosche ............. | G06F 11/3447 |
| 2011/0029412 A1* | 2/2011 | Laughlin et al. ....... | 705/28 |

(Continued)

*Primary Examiner* — Vanel Frenel

(57) ABSTRACT

Implementations described and claimed herein provide systems and methods for managing inventory usage to predict when a pool of available inventory will become exhausted based on past usage trend data. In one implementation, raw usage data is extracted from a first data sample. The first data sample has a first input time, and the raw usage data specifies a total amount of inventory for one or more inventory types. The total amount of inventory is categorized for each of the inventory types into an amount of used inventory and an amount of available inventory. A projected inventory usage for each of the inventory types is generated based on the categorized total amount of inventory. The projected inventory usage defines an availability status of each of the inventory types.

15 Claims, 12 Drawing Sheets

(56) References Cited

U.S. PATENT DOCUMENTS

2012/0271953 A1* 10/2012 Gulley ................. G06F 9/5027
709/226
2013/0246228 A1* 9/2013 Xing ................... G06Q 10/087
705/28

* cited by examiner

SYSTEMS AND METHODS FOR MANAGING INVENTORY USAGE

CROSS-REFERENCE TO RELATED APPLICATIONS

The present application claims benefit under 35 U.S.C. § 119(e) to U.S. Provisional Patent Application No. 61/759,222, entitled "Systems and Methods for Managing Inventory Usage" and filed on Jan. 31, 2013. This application is specifically incorporated by reference in its entirety herein.

TECHNICAL FIELD

Aspects of the present disclosure relate to the management of inventory, and in particular, systems and methods for managing the usage of inventory and for predicting when available inventory will be consumed.

BACKGROUND

Many industries obtain, assign, and/or distribute inventory to a large number of customers. For such industries, it is challenging to manage available inventory. For example, it can be difficult to predict when the available inventory will be consumed and more will be needed. In such instances, the inventory may be unavailable when it is needed, resulting in delays and other obstacles in providing inventory to customers.

In the telecommunications industry, companies often purchase a large amount of licenses from a vendor to be able to assign a license to a customer in connection with the services and/or products provided. However, many vendors provide licenses to a variety of different software, hardware, telephony features, or services to a company. These licenses are frequently assigned to customers at different intervals. For example, licenses to a circuit path into a network for making telephone calls may be assigned more frequently than licenses to a call forwarding feature. Thus, license inventories are used at different rates. Moreover, if some license inventory is depleted, there can be delays in activating a license for a customer, in providing a service or feature to a customer, or in connecting a customer to a communications network.

Besides the problem of exhausting license inventory, without knowledge of the availability of certain licenses, technicians in the field may not be able to activate certain features during installation resulting in inefficiencies and customer dissatisfaction. For example, when connecting a new customer to a communications network, a field technician generally travels to a customer site to provide installation services, including connecting the customer to the network and providing access to designated software, hardware, features, or services. In doing this, the field technician also needs to assign various licenses to the customer. In some conventional systems, it is often difficult to determine whether a particular license is available until the field technician attempts to assign the license to the customer. If the pool of available licenses from the vendor has been exhausted, the field technician will be unable to complete the installation. As a result, the installation is delayed until: new licenses are purchased from or provided temporarily by the vendor; a permanent license is assigned to the customer; and the field technician returns or remotely completes the installation.

It is with these observations in mind, among others, that various aspects of the present disclosure were conceived and developed.

SUMMARY

Implementations described and claimed herein address the foregoing problems by providing systems and methods for managing inventory usage to predict when a pool of available inventory will become exhausted based on past usage trend data. In one implementation, raw usage data is extracted from a first data sample. The first data sample has a first input time, and the raw usage data specifies a total amount of inventory for one or more inventory types. The total amount of inventory is categorized for each of the inventory types into an amount of used inventory and an amount of available inventory. A projected inventory usage for each of the inventory types is generated based on the categorized total amount of inventory. The projected inventory usage defines an availability status of each of the inventory types.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
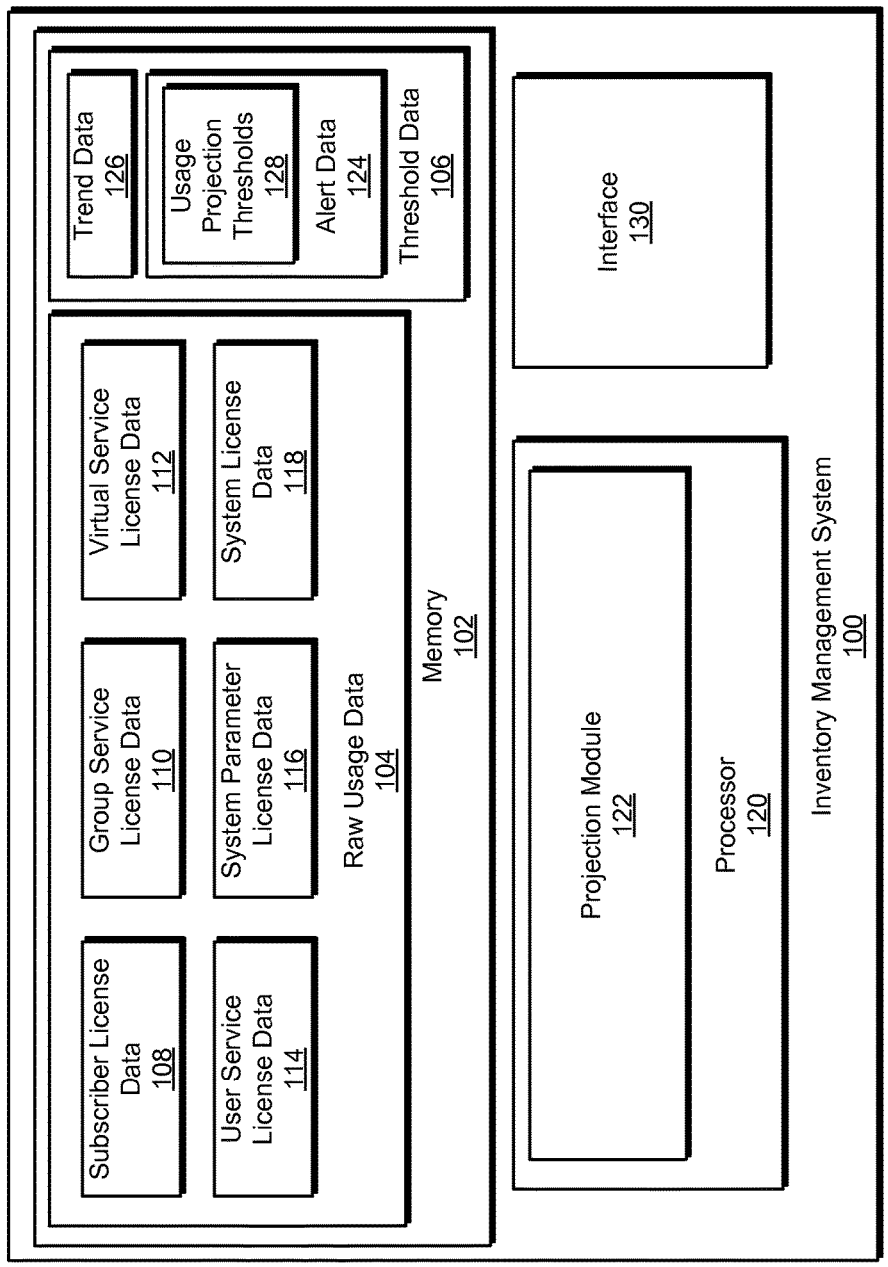
FIG. 1 is an example system for managing the usage and availability of inventory.

Aspects of the present disclosure involve inventory management and associated systems and methodologies to manage inventory usage to predict when to obtain additional inventory to prevent a pool of available inventory from becoming exhausted. Other aspects involve ascertaining trending usage for a set of inventory for use in business management, for example, to determine whether a particular product is commercially valuable. In some specific implementations, the system involves the management of licenses required to provide various telecommunications services and to ensure that such licenses are not inadvertently exhausted when such licenses are to be assigned to a customer.

In one aspect, raw data relating to usage and availability of inventory is obtained. Stated differently, the raw data includes a total amount of inventory, which is separated into an amount of used inventory and an amount of available inventory over a given time period. To manage the pool of available inventory, inventory usage projections are generated using the raw data. The inventory usage projections include a percentage used, an average daily unit usage, and a projected number of days until exhaustion. Usage projection thresholds, such as a percentage of inventory used threshold and a number of days until inventory exhaustion threshold are obtained. The usage projection thresholds are used to generate alerts relating to a projected availability of inventory. For example, if the calculated percentage used exceeds or is projected to exceed the percentage of inventory used threshold, an alert is generated. Similarly, if the projected number of days until exhaustion falls below the number of days until inventory exhaustion threshold, an alert is generated. The alerts indicate when available inventory will be consumed.

Further, the inventory usage projections may include an estimated unit purchases needed, calculated based on the raw data and the usage projection thresholds. The estimated unit purchases needed conveys the amount of additional inventory needed to remain within the usage projection thresholds. For example, the estimated unit purchases needed shows the amount of additional inventory needed to remain above the number of days until inventory exhaustion threshold and below the percentage of inventory used threshold. The estimated unit purchases needed indicates when to purchase or reallocate inventory to prevent the pool of available inventory from becoming exhausted.

Inventory usage trends are determined based on the total amount of inventory and the amount of used inventory over regular intervals for a given time period. For example, the inventory usage trends may show the amount of used inventory as compared to the total amount of inventory on a monthly basis for a year. As such, the inventory usage trends may indicate, for example: whether to purchase additional inventory, reallocate inventory, or remove inventory; whether a certain time period has a higher demand; whether a certain product, inventory type, and/or customer is commercially valuable; etc.

The following description is given in the context of license usage management in the communications industry. Such licenses include, without limitation, licenses to telephony features, trunking licenses, software licenses, hardware licenses, and licenses to other services or functionality. However, it will be appreciated by those of ordinary skill that the presently disclosed technology may be applied in other contexts and/or other industries to manage inventory usage.

Referring to FIG. 1, an example inventory management system 100 for managing the usage and availability of licenses is shown. In one implementation, the system 100 includes memory 102, a processor 120, and an interface 130.

The memory 102 includes raw data 104 and threshold data 106. In one implementation, the raw data 104 is gathered from network switches, routers, other network devices, and/or vendor software and relates to usage and availability of a license type over a given time period. In other words, the raw data 104 includes a total amount of licenses purchased from a vendor for each license type, which is categorized into an amount of used licenses and an amount of available licenses for each license type for a data sample. Each data sample is input into the memory 102 at an input time. In one implementation, a data sample is automatically input into the memory 102 at regular intervals (e.g., hourly, daily, weekly, monthly, yearly, etc.). In another implementation, a data sample is input manually into the memory 102. The raw data 104 may be organized according to each data sample (i.e., by input time) and according to license type within each data sample.

In one implementation, the raw data 104 includes subscriber license data 108, group service license data 110, virtual service license data 112, user service license data 114, system parameter license data 116, and system license data 118. The data 108, 110, 112, 114, 116, and 118 may each include information corresponding to different license types, as shown in FIGS. 2A-2F. For example, the subscriber license data 108 may include information relating to one or more license types for subscriber(s), each license type having a total amount of licenses purchased from a vendor, which is separated into an amount of used licenses and/or an amount of available licenses for each data sample.

The threshold data 106 includes alert data 124 and trend period data 126 used to determine inventory usage projections and inventory usage trends. In one implementation, the alert data 124 includes usage projection thresholds 128 that are used to generate an alert if projected usage and/or availability of a license type fall outside the usage projection threshold. The usage projection thresholds 128 may be automatically set based on past usage trends and/or past usage projections or manually set. For example, if past trends indicate a license type is likely to be consumed faster or have a greater demand, then the usage projection thresholds 128 may be more restrictively set such that an alert is generated earlier relative to other license types. The alerts also indicate when available licenses for the license type are expected to run out. The alert may be, for example, an audible or visual alarm, a message (e.g., an email or push notification), etc. As can be understood from FIGS. 2A-4B, in one particular implementation, projected usage and/or availability is displayed on a user interface in a spreadsheet, and the alerts are visual alarms in the form of highlighting of data falling outside the usage projection thresholds.

In one implementation, the usage projection thresholds 128 include a percentage used threshold and a time until exhaustion threshold. The percentage used threshold generates an alert for a license type based on a calculated percentage used during a given time period. The calculated percentage used reflects a percentage of a total amount of licenses purchased from a vendor that are used (i.e., assigned to a customer). If the calculated percentage used exceeds or is projected to exceed the percentage used threshold, an alert is generated. The time until exhaustion threshold generates an alert for a license type based on a projected amount of time until the total amount of licenses purchased from a vendor are used, assigned or otherwise exhausted. The time may be any interval, including, but not limited to, days, weeks, months, or years. If the projected number of days until exhaustion falls below the number of days until inventory exhaustion threshold, an alert is generated.

The trend period data 126 corresponds to one or more data samples, each input into the memory 102 at an input time. The trend period data 126 is used to set how many data samples to use in calculating projected usage and availability of a license type based on a first data sample having a first input time, a second data sample having a second input time, and any data samples input into the memory 102 between the first input time and the second input time. In one implementation, the first data sample is the earliest data sample in the raw data 104, and the second data sample is the newest data sample in the raw data 104. In other implementations, the first data sample is any of the past data samples stored in the memory 102. The trend period data 126 specifies how many data samples to use in calculations, projections, and/or trends by setting a time interval (e.g., hours, days, weeks, months, years, etc.) since the first input time.

The processor 120 includes a projection module 122. In one implementation, the projection modules 122 uses the raw data 104 and/or the threshold data 106 to calculate projected license usage and availability of one or more license types and to determine when to obtain additional licenses. As described with respect to FIGS. 3-4B, the projection license usage may be license usage projections or license usage trends for each license type over the time interval.

In one implementation, the license usage projections include a percentage used calculation, an average period unit usage calculation, a projected exhaustion time, and an estimated unit purchases needed. The percentage used is calculated based on a percentage of the total amount of licenses purchased that has been assigned to customers or otherwise used. If the calculated percentage used exceeds the percentage used threshold, the projection module 122 generates an alert.

The average period unit usage for a license type is calculated based on a past usage, current usage, and the trend period data 126. Stated differently, the projection module 122 calculates the average period unit usage based on: the amount of licenses used in the data samples that were input between the first and second input times (past usage); the amount of licenses used in the second data sample (current usage); and the time elapsed between the first and second input times, as determined from the trend period data 126. In one implementation, the average period unit usage is proportional to:

$$\frac{(U_C - U_P)}{(t_2 - t_1)},$$

where $U_P$ is the past usage, $U_C$ is the current usage, $t_1$ is the first input time, and $t_2$ is the second input time. The average period unit usage may be calculated for any period of time (e.g., an average daily unit usage).

The projected exhaustion time represents an estimated time (e.g., days) remaining until a pool of available licenses for a license type is exhausted. In one implementation, the projected exhaustion time is calculated based on: the past usage, the current usage, the average period unit usage, and the trend period data 126. In one implementation, the projected exhaustion time is proportional to:

$$\frac{L_A}{U_{Avg}},$$

where $U_{Avg}$ is the average period unit usage and $L_A$ is the available unassigned licenses. In some implementations, the projection module 122 considers additional factors, such as whether the rate at which installs occur is likely to change for a license type, when the used and available licenses will expire, etc. in determining the projected exhaustion time for the license type.

The estimated unit purchases needed conveys the amount of additional licenses needed to remain within the usage projection thresholds 128 for a license type. For example, the estimated unit purchases needed shows the amount of additional licenses needed to remain above the time until exhaustion threshold and below the percentage used threshold. The estimated unit purchases needed indicates when to purchase or reallocate licenses to prevent the pool of available licenses for the license type from becoming depleted.

The projection module 122 calculates the estimated unit purchases needed based on the projected exhaustion time and the average period unit usage. Where the projected exhaust time is sooner than a threshold or desired exhaustion time, the projected exhaustion time is subtracted from the threshold or desired exhaustion time. In one implementation, the estimated unit purchases needed is proportional to: $(U_{Avg} \times (t_T - t_E) + c$, where $U_{Avg}$ is the average period unit usage, $t_E$ is the projected exhaustion time, $t_T$ is the threshold or desired exhaustion time, and c is a padding. Padding may be added to the estimated unit purchases needed to ensure the pool of available licenses for a license type is not exhausted.

In one implementation, license usage trends are determined based on the total amount of licenses purchased for a license type and the amount of licenses used over the time interval between the first input time and the second input time. For example, the license usage trends 130 may show the amount of used licenses for a license type as compared to the total amount of purchased licenses for that license type on a monthly basis for a year. As such, the license usage trends may indicate whether to purchase additional licenses or reallocate purchased licenses from another source. For example, if a relatively small amount of licenses are needed and another source has consistently unused licenses, the licenses may be reallocated rather than purchased. The license usage trends may further indicate whether installs occur for a license type more frequently during a certain time period (e.g., fall). Additionally, the license usage trends may indicate whether a license type is commercially valuable. For example, if a license type consistently is not assigned during installs, fewer, if any, licenses for that licenses type may be purchased. Other license usage, license availability, and business management information will be apparent from the license usage trends.

In one particular implementation, the projection module 122 calculates the license usage projections and the license usage trends for each pair of redundant servers in a network, as well as for the network as a whole, for each license type over the time interval. The projection module 122 determines the estimated unit purchases needed for each server pair and for the entire network. The license usage projections and the license usage trends may be used to determine whether to purchase additional licenses for the network as a whole or for a server pair or to reallocate licenses from one server pair to another server pair in the network. Generally, a contract with a vendor to purchase licenses for a license type has a lower purchase price where more licenses are purchased at one time. As such, often it is more cost effective to purchase licenses for the network as a whole and allocate the licenses to each server pair as needed. If additional licenses are not needed for the network as a whole, licenses may be allocated from one server pair to another such that new licenses do not need to be purchased from the vendor. For example, if one server pair has a flat usage trend for a license type with consistently available licenses, it is likely safe to reallocate the available licenses to another server pair according to the estimated unit purchases needed for that server pair.

In one implementation, data is input via the interface 130, and the license usage projections and the license usage trends are output via the interface 130, for example, for display on a user interface (e.g., a graphical user interface). The displayed projections and trends provide a quick visual cue regarding license usage, availability, trends, and projections. In one implementation, the alerts are displayed on the user interface to provide quick notification of approaching problems.

FIGS. 2A-2F show the interface 130 displaying the raw data 104. As shown, the interface 130 displays the raw data 104, for example, as a spreadsheet. In one implementation, the raw data 104 includes a total amount of licenses (e.g., purchased from a vendor), which is categorized for each license type into an amount of used licenses and an amount of available licenses. The raw data 104 may be further categorized based on an input time of the data sample, an expiration date for the licenses, an amount used by a particular group or type of user (e.g., a hosted user or trunk user), or the like.

Figure 2A:
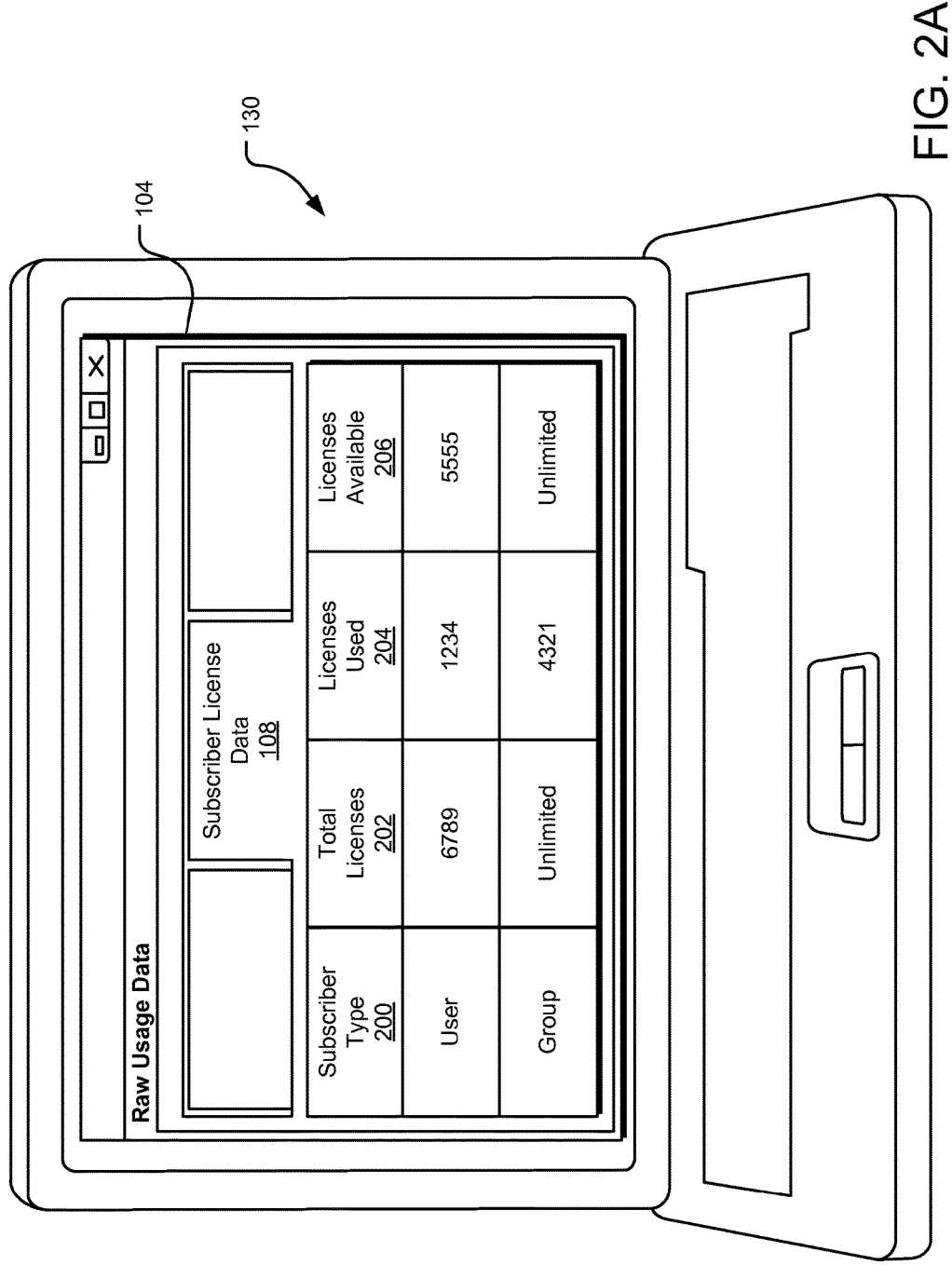
FIG. 2A shows an example user interface displaying subscriber license data.

Turning to FIG. 2A, the interface 130 displays the subscriber license data 108. In one implementation, the subscriber license data 108 includes data organized by a subscriber license type 200, which may be, for example, a user license type or a group license type. For each of the subscriber license types 200, a total amount of licenses 202 is shown, which is categorized into an amount of licenses used 204, and an amount of licenses available 206 is displayed. In one implementation, where the amount of total licenses 202 is unlimited, the amount of licenses available 206 is similarly shown as unlimited, regardless of the amount of licenses used 204.

Figure 2B:
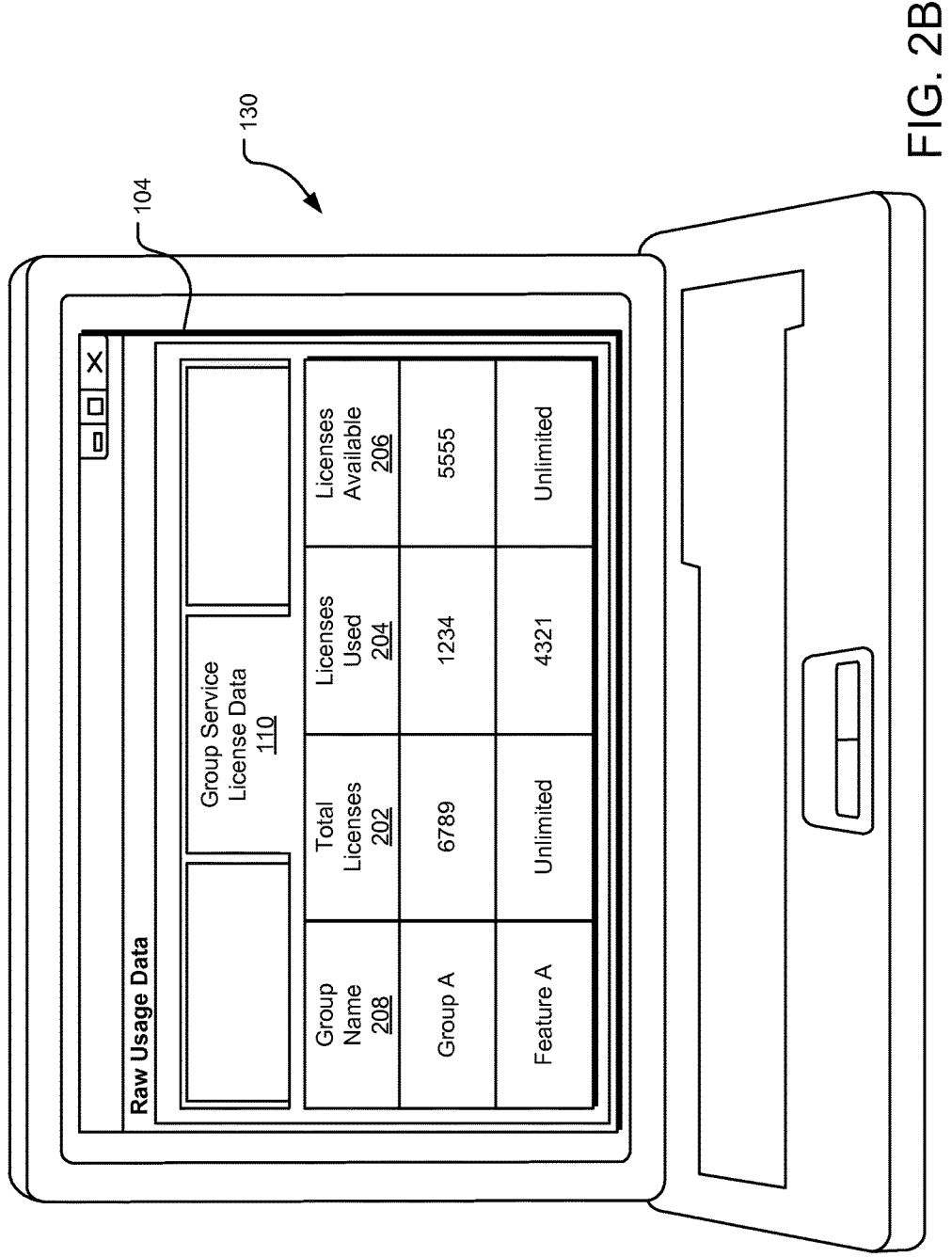
FIG. 2B depicts an example user interface displaying group service license data.

As can be understood from FIG. 2B, the interface 130 displays the group service license data 110. In one implementation, the license types corresponding to the group service license data 110 are reflected by a group name 208, which may be, for example, a specified licensed group or a licensed group feature or service. In one implementation, the group features or services may include, without limitation, custom ringback, instant conferencing, authorization codes, standard group services, premium group services, and the like. For each of the group names 208, the total amount of licenses 202 is shown, which is categorized into the amount of licenses used 204, and the amount of licenses available 206 is displayed. In one implementation, where the amount of total licenses 202 is unlimited, the amount of licenses available 206 is similarly shown as unlimited, regardless of the amount of licenses used 204.

Figure 2C:
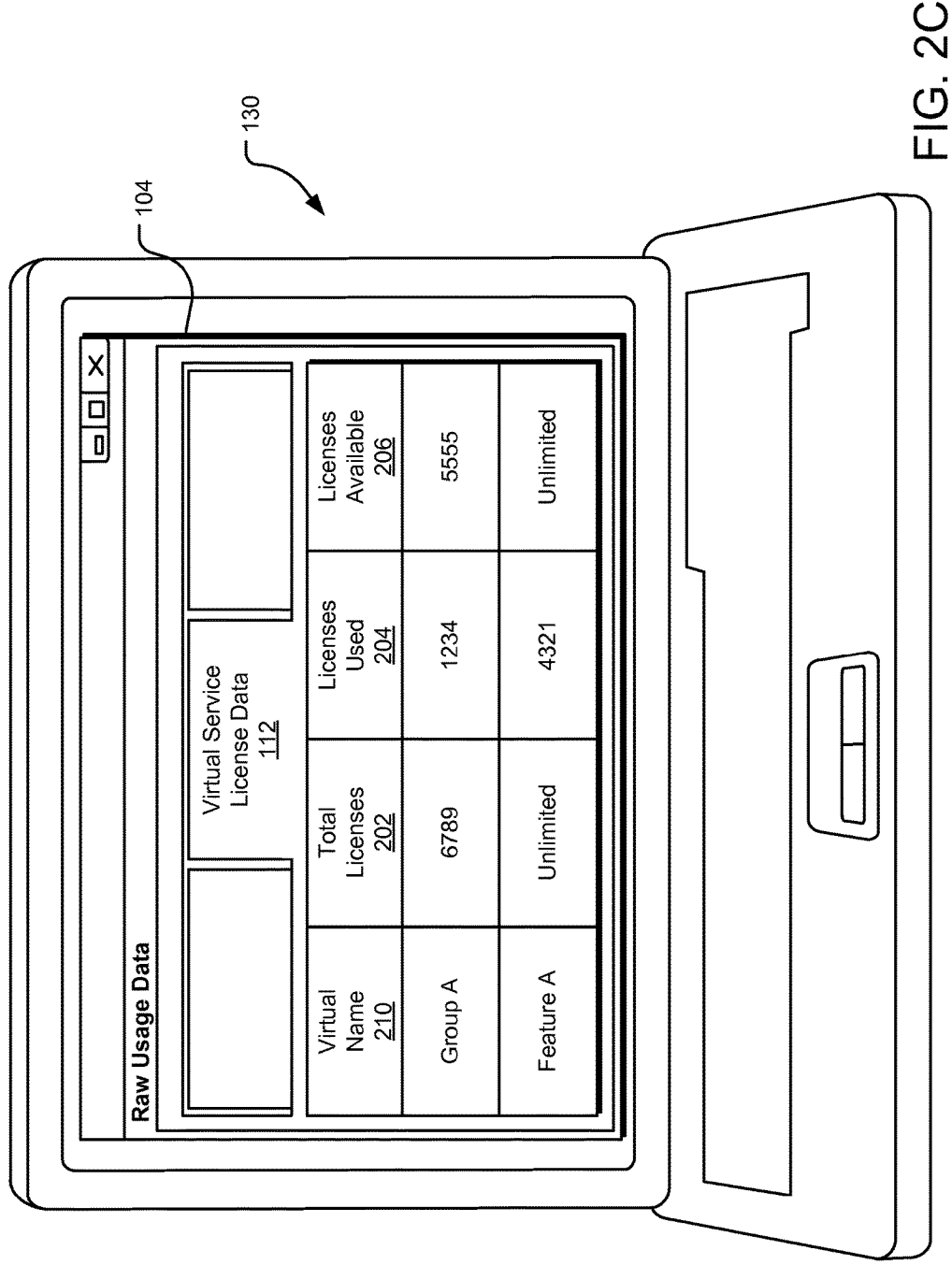
FIG. 2C shows an example user interface displaying virtual service license data.

FIG. 2C shows the virtual service license data 112 on the interface 130. In one implementation, the license types corresponding to the virtual service license data 112 are reflected by a virtual name 210, which may be, for example, a specified licensed group or a licensed group feature or service. In one implementation, the group features or services may include, without limitation, virtual services, including, for example, auto attendant, call center, instant group call, trunk group, and the like. For each of the virtual names 210, the total amount of licenses 202 is shown, which is categorized into the amount of licenses used 204, and the amount of licenses available 206 is displayed. In one implementation, where the amount of total licenses 202 is unlimited, the amount of licenses available 206 is similarly shown as unlimited, regardless of the amount of licenses used 204.

Figure 2D:
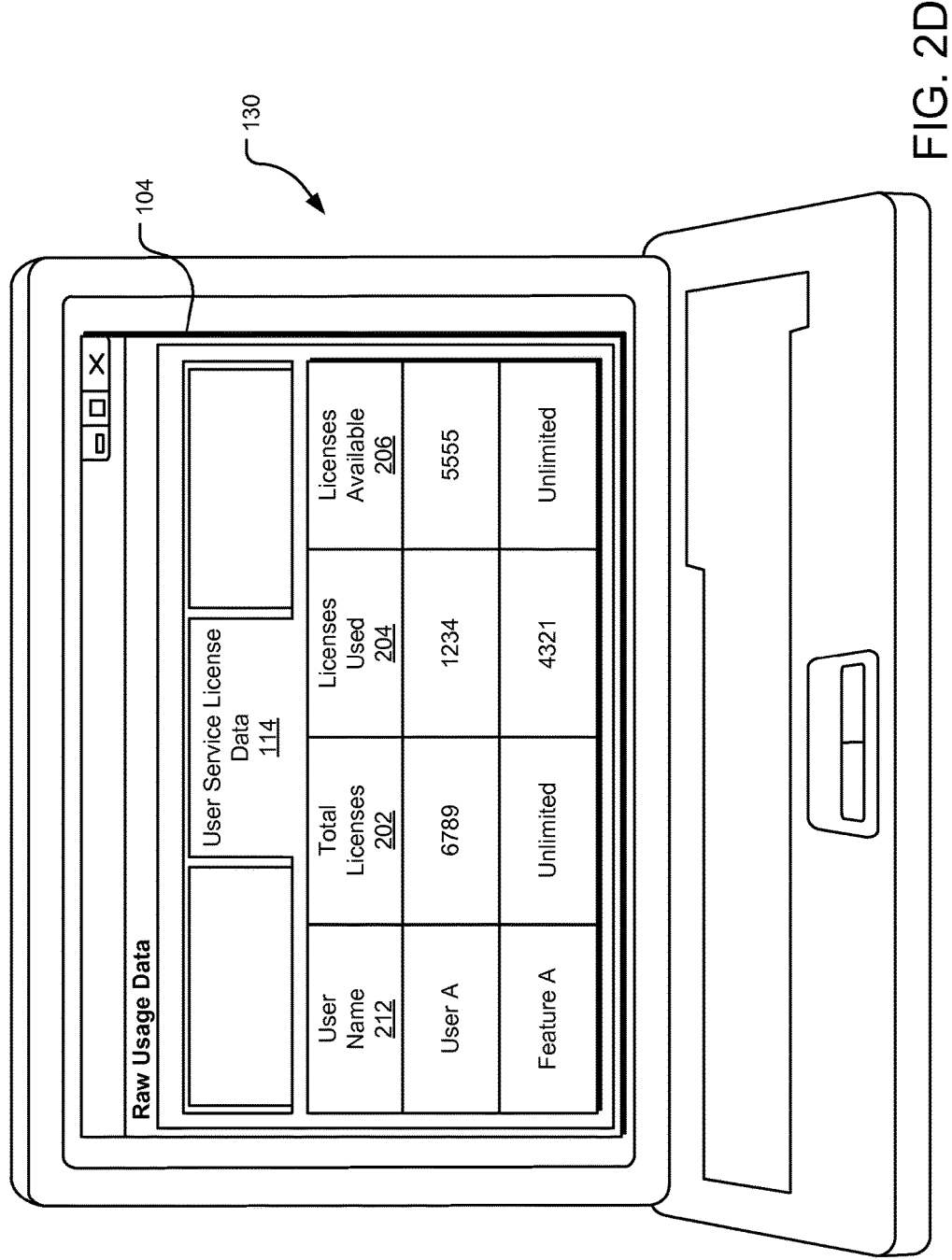
FIG. 2D illustrates an example user interface displaying user service license data.

Referring to FIG. 2D, the user service license data 114 is shown on the interface 130. In one implementation, the license types corresponding to the user service license data 114 are reflected by a user name 212, which may be, for example, a specified licensed user or a licensed user feature or service. In one implementation, the user features or services may include, without limitation, base user services, business line user services, standard user services, personal mobility user services, premium user services, and particular features, such as: assistant, automatic hold/retrieve, communicator, receptionist services, call notify, call center, calling line, custom ringback, external custom ringback, fax messaging, messaging, mobility, video add-on, and the like. For each of the user names 212, the total amount of licenses 202 is shown, which is categorized into the amount of licenses used 204, and the amount of licenses available 206 is displayed. In one implementation, where the amount of total licenses 202 is unlimited, the amount of licenses available 206 is similarly shown as unlimited, regardless of the amount of licenses used 204.

Figure 2E:
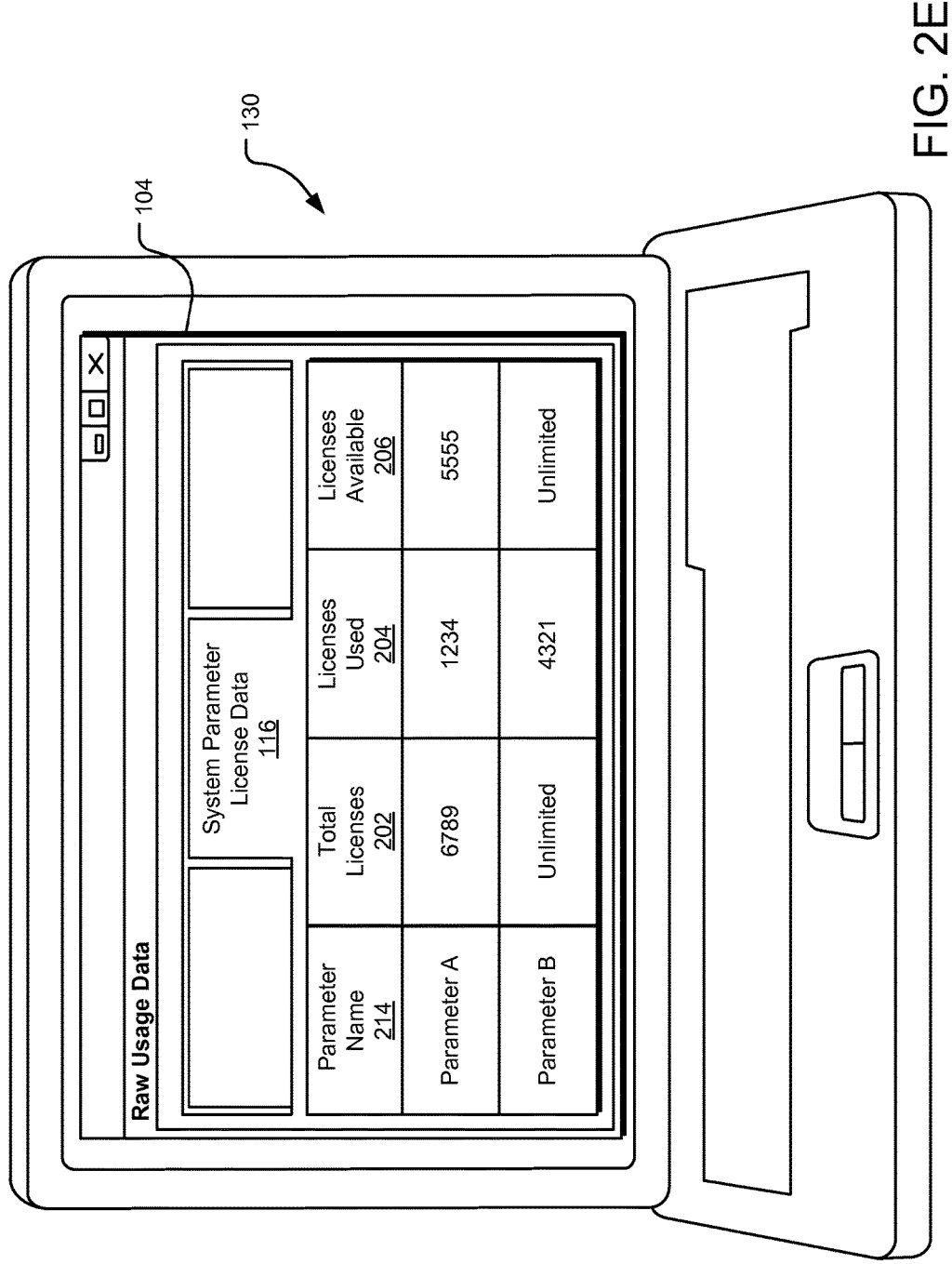
FIG. 2E shows an example user interface displaying system parameter license data.

As can be understood from FIG. 2E, the system parameter license data 116 is shown on the interface 130. In one implementation, the license types corresponding to the system parameter license data 116 are reflected by a parameter name 214, which may be, for example, a specified system parameter. In one implementation, the parameters may include, without limitation, trunking call capacity, trunking busting call capacity, and the like. For each of the parameter names 214, the total amount of licenses 202 is shown, which is categorized into the amount of licenses used 204, and the amount of licenses available 206 is displayed. In one implementation, where the amount of total licenses 202 is unlimited, the amount of licenses available 206 is similarly shown as unlimited, regardless of the amount of licenses used 204.

Figure 2F:
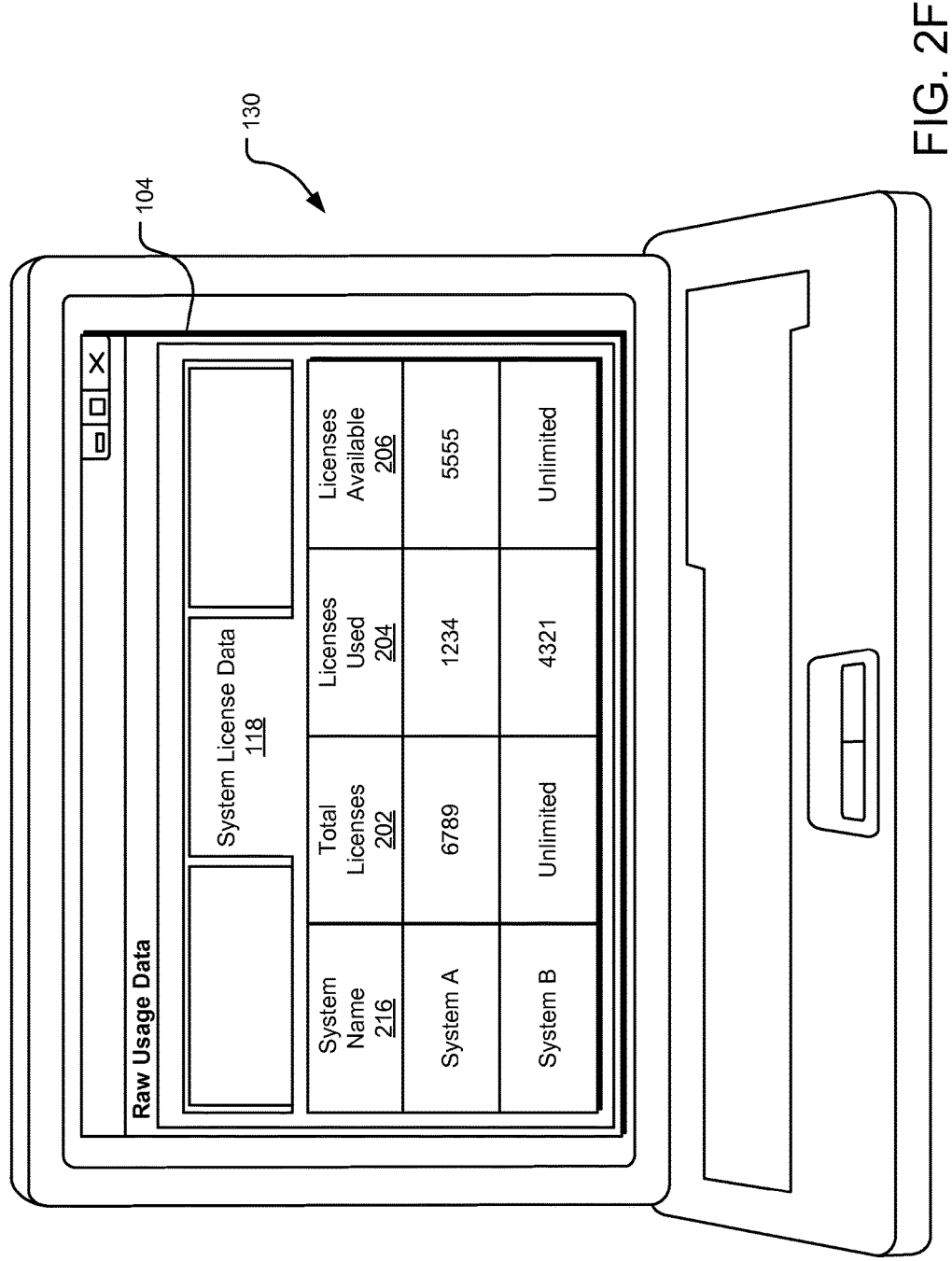
FIG. 2F shows an example user interface displaying system license data.

FIG. 2F displays the system license data 118 on the interface 130. In one implementation, the license types corresponding to the system license data 118 are reflected by a system name 216, which may be, for example, a specified system feature or service. In one implementation, the system features or services may include, without limitation enterprise voice portal, lawful interfacept event monitoring, lawful intercept media monitoring, network-wide messaging, Session Initiation Protocol (SIP) running on Transmission Control Protocol (TCP), Service packs, SH interface, and the like. For each of the system names 216, the total amount of licenses 202 is shown, which is categorized into the amount of licenses used 204, and the amount of licenses available 206 is displayed. In one implementation, where the amount of total licenses 202 is unlimited, the amount of licenses available 206 is similarly shown as unlimited, regardless of the amount of licenses used 204.

Figure 3:
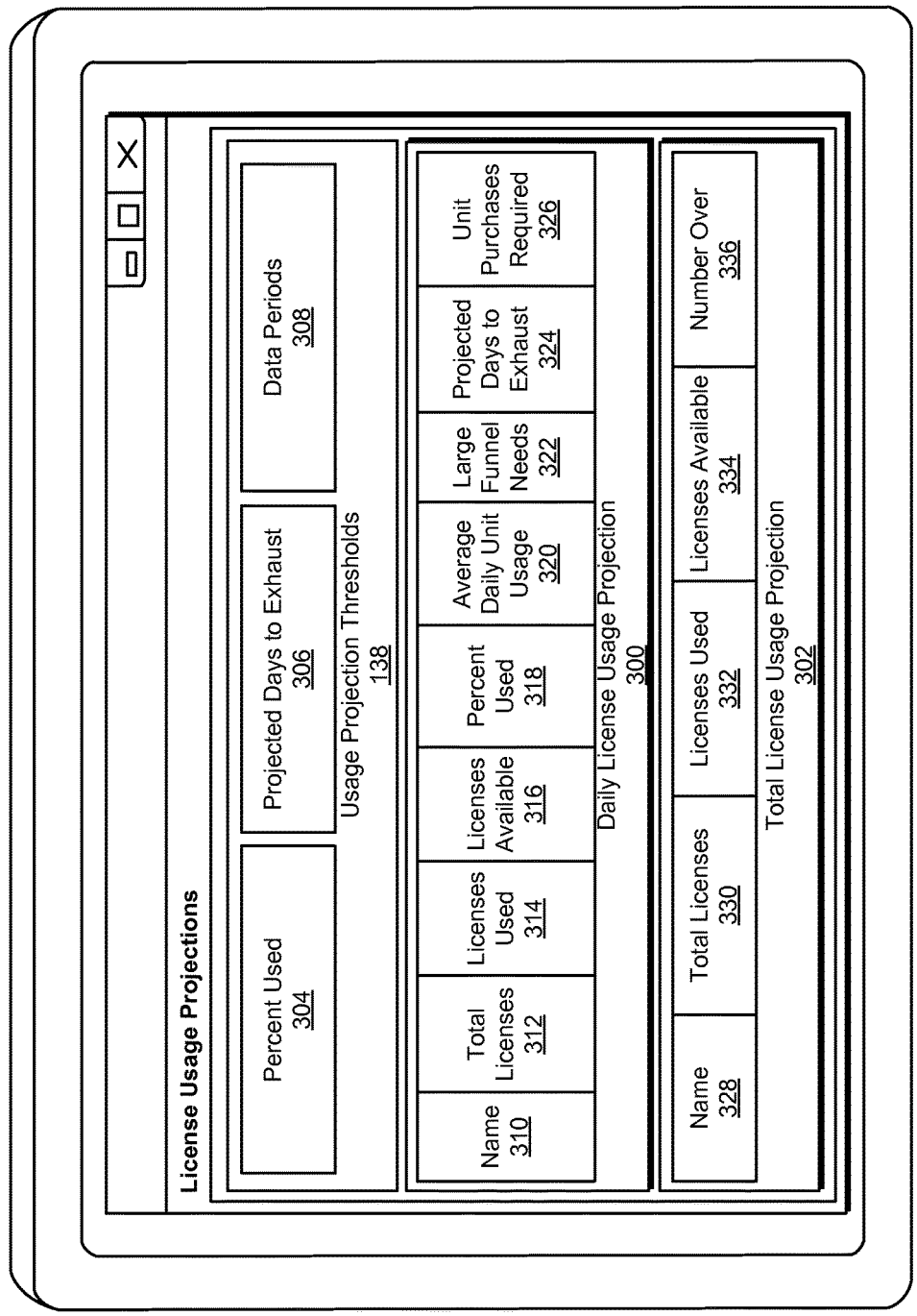
FIG. 3 depicts an example user interface displaying usage projection results.

FIG. 3 depicts the interface 130 displaying the license usage projections, separated into a daily license usage projection 300 and a total license usage projection 302. In one implementation, the daily license usage projections 300 are organized by data sample and further organized by license type. For example, a data sample input on a date may be organized according to each of the following license types: base licenses, business line licenses, standard licenses, mobility licenses, premium licenses, call notify licenses, and messaging licenses.

The usage projection thresholds 138 may be shown on the interface 130 to permit adjustment of the various usage projection thresholds 138 in calculating the daily license usage projections 300 and/or the total license usage projections 302. For example, the usage projection thresholds 138 may include a percent used threshold 304 and a projected time to exhaust threshold 306, as described herein. The usage projection thresholds 138 may further include a data periods control 308 to set trend data periods.

For each license type, the interface 130 displays a name 310 and a total amount of licenses 312, which is categorized into an amount of licenses used 314 and an amount of licenses available 316. The daily license usage projections 300 includes the projected license usage calculated for one or more of the license types, as described herein. In one implementation, the interface 130 displays at least one of: a percentage used calculation 318, an average period unit usage calculation 320, an estimation of large funnel needs calculation 322, a projected exhaustion time calculation 324, and an estimated unit purchases required calculation 326. In one implementation, the daily license usage projections 300 are displayed for each server pair.

The total license usage projections 302 for the network as a whole are additionally calculated for the data sample and displayed by license type. In one implementation, the license types for the total license usage projections 302 may include, without limitation, business line, standard services, personal mobility, premium services, or the like. As shown in FIG. 3, the total license usage projections 302 for the network as a whole may include, for example, a total amount of licenses 330, an amount of used licenses 332, an amount of available licenses 334, and amount over 336 the total licenses 330.

Figure 4A:
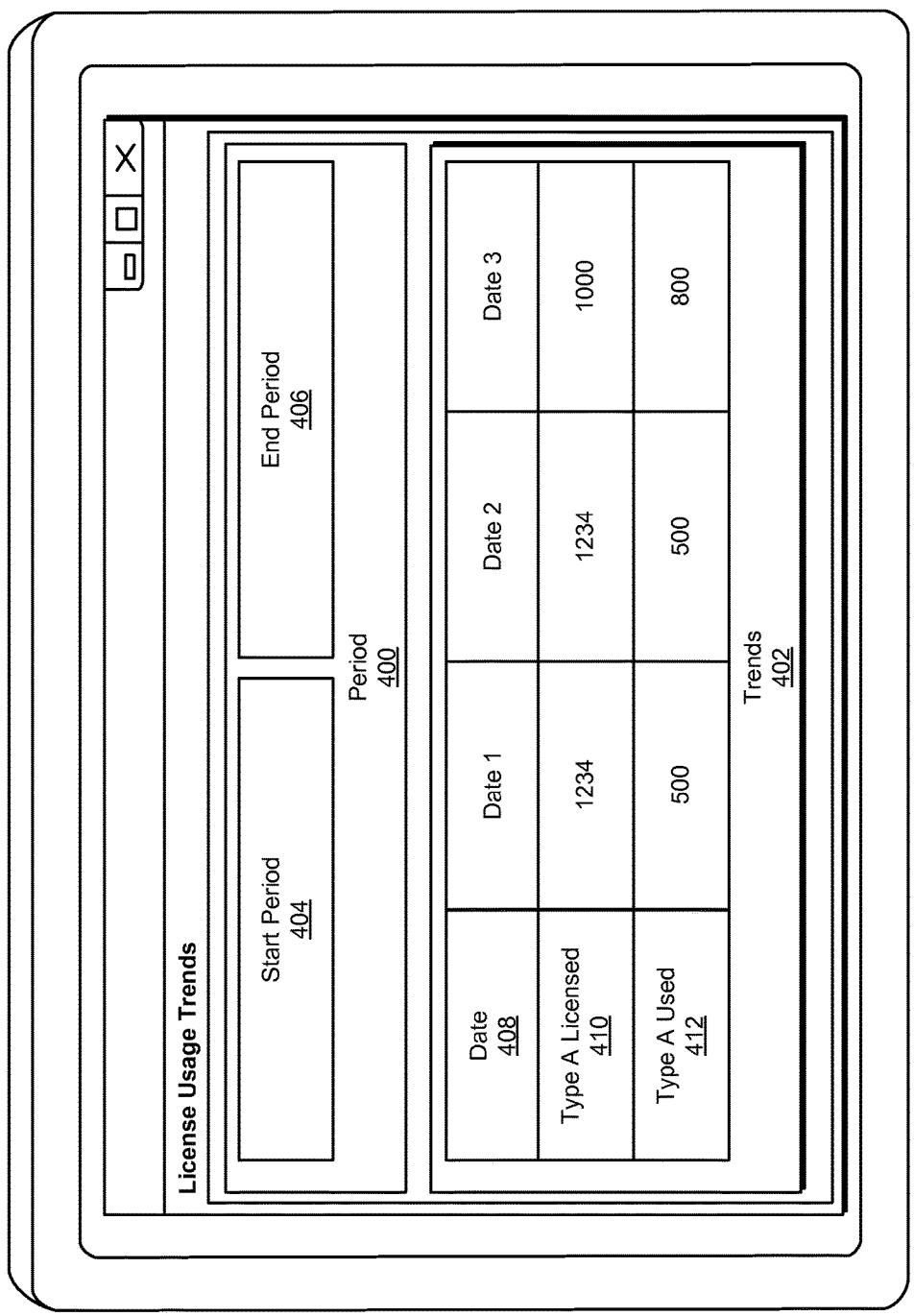
FIG. 4A shows an example user interface displaying usage trend results.

FIG. 4A shows the user interface 130 displaying license usage trends 402 for a given period 400 from a start period 404 to an end period 406. In one implementation, the license usage trends 402 are organized by input date 408 and license type. For each license type and input date 408, a total amount of licenses 410 and an amount of licenses used 412 is shown. The start period 404 and the end period 406 may be set to compute the license usage trends 402 over a plurality of input times. In one implementation, the license types include, without limitation, Concurrent Call Path (CCP) services, business lines, standard services, mobility services, premium services, messaging services, and the like.

Figure 4B:
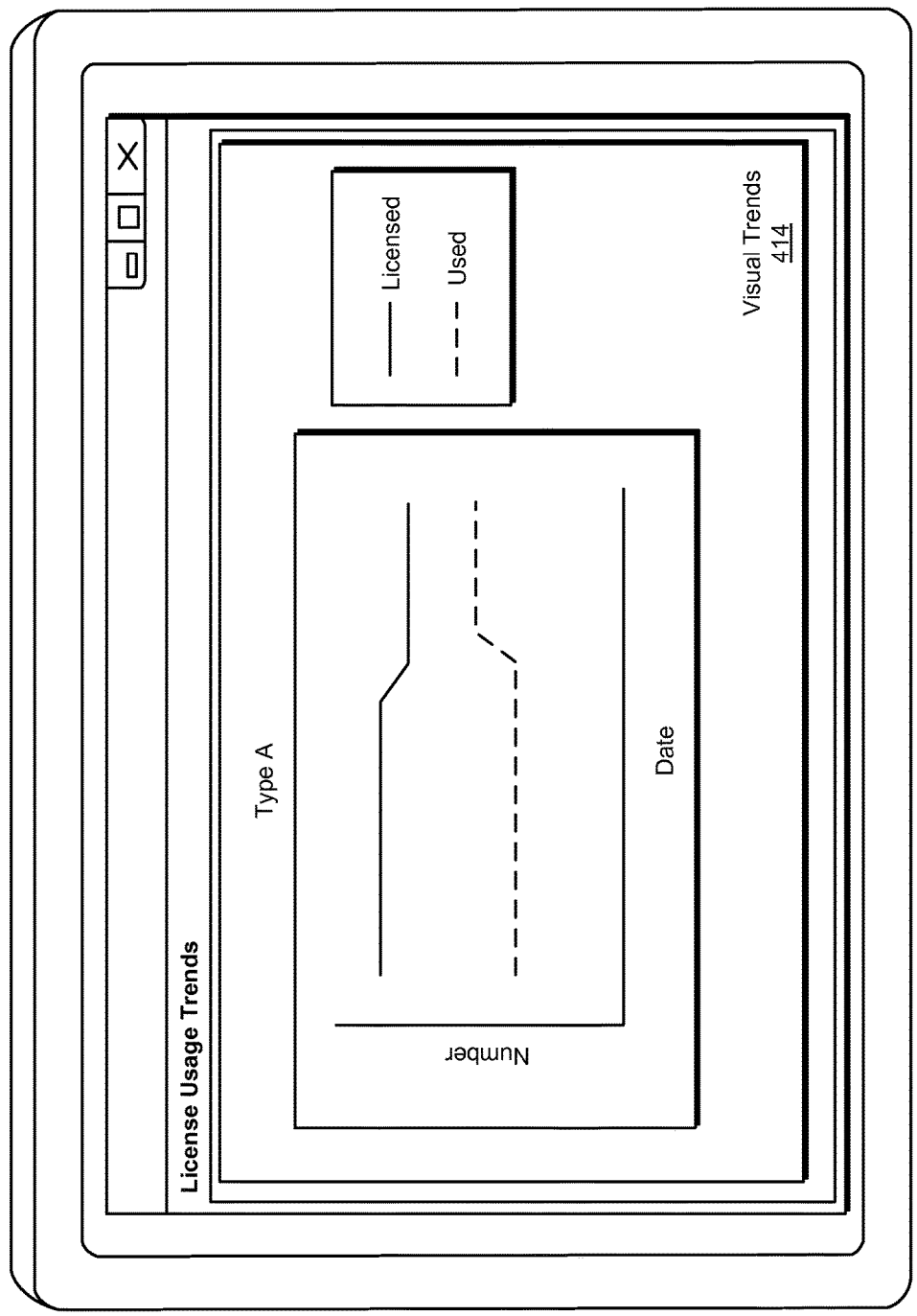
FIG. 4B illustrates an example user interface displaying a visual representation of the usage trend results from FIG. 4A.

FIG. 4B illustrates a visual representation 414 of the license usage trends 402 from FIG. 4A. In one implementation, as shown in FIG. 4B, the visual representation 414 is presented as a graph for each license type. The total amount of licenses 410 and the amount of licenses used 412 are each shown from the start period 404 to the end period 406. The visual representation 414 provides a quick visual cue regarding license usage and availability.

Figure 5:
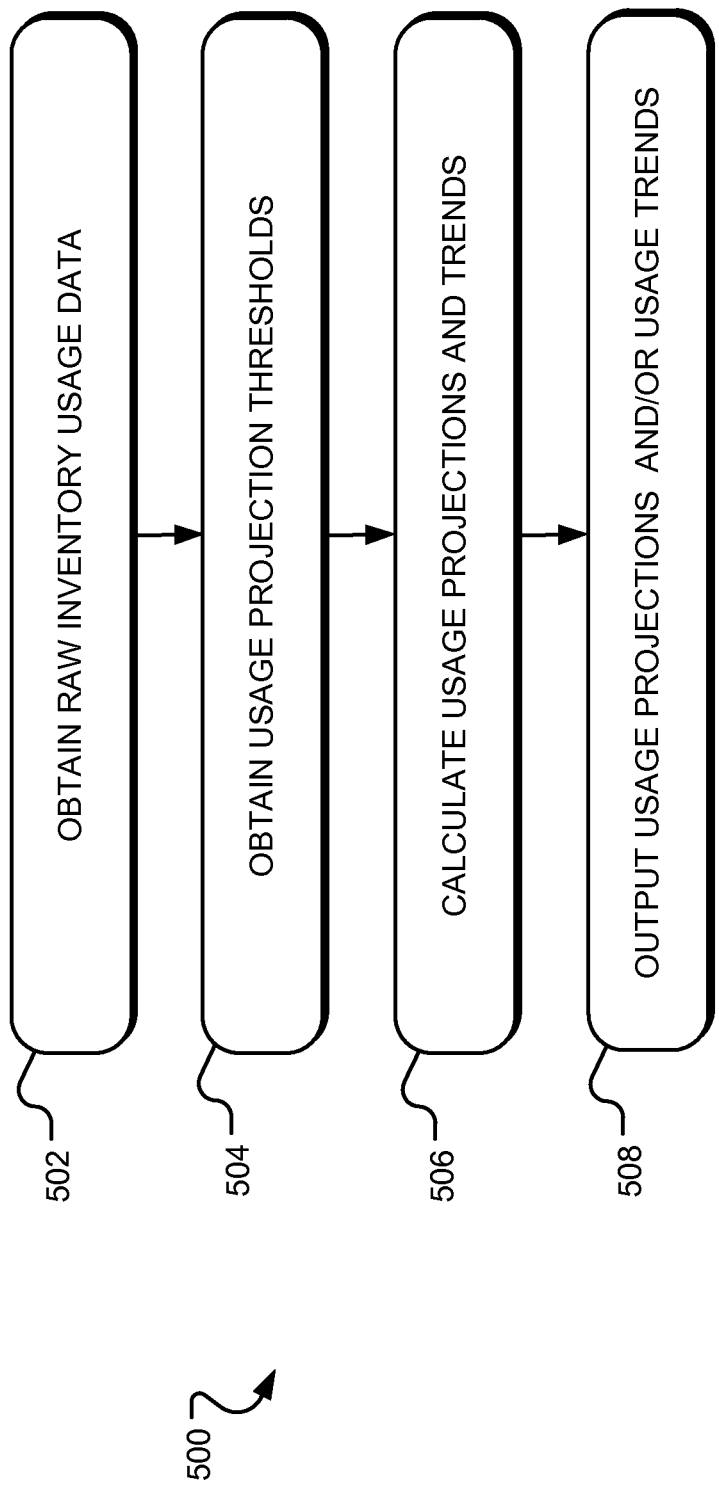
FIG. 5 is a flow chart illustrating example operations for managing inventory.

FIG. 5 is a flow chart illustrating example operations 500 for managing inventory. In one implementation, an obtaining operation 502 obtains raw data relating to usage and availability of inventory over a given time. The raw data includes a total amount of inventory, which is separated into an amount of used inventory and an amount of available inventory for one or more data samples each having an input time.

A second obtaining operation 504 obtains usage projection thresholds, such as a percentage of inventory used threshold and a number of days until inventory exhaustion threshold. The usage projection thresholds are used to generate alerts relating to a projected availability of inventory. For example, if the calculated percentage used exceeds or is projected to exceed the percentage of inventory used threshold, an alert is generated. Similarly, if the projected number of days until exhaustion falls below the number of days until inventory exhaustion threshold, an alert is generated. The alerts indicate when available inventory will be depleted.

A calculating operation 506 calculates inventory usage projections and trends using the raw usage data. In one implementation, the inventory usage projections include a percentage used, an average daily unit usage, and a projected number of days until exhaustion. Further, the inventory usage projections may include an estimated unit purchases needed, calculated based on the raw data and the usage projection thresholds. The estimated unit purchases needed conveys the amount of additional inventory needed to remain within the usage projection thresholds. For example, the estimated unit purchases needed shows the amount of additional inventory needed to remain above the number of days until inventory exhaustion threshold and below the percentage of inventory used threshold. The estimated unit purchases needed indicates when to purchase or reallocate inventory to prevent the pool of available inventory from becoming depleted when needed for assigning to a customer.

The calculating operation 506 determines Inventory usage trends based on the total amount of inventory and the amount of used inventory over regular intervals for a given time period. For example, the inventory usage trends may show the amount of used inventory as compared to the total amount of inventory on a monthly basis for a year. As such, the inventory usage trends may indicate, for example: whether to purchase additional inventory, reallocate inventory, or remove inventory; whether a certain time period has a higher demand; whether a certain product, inventory type, and/or customer is commercially valuable; etc. An outputting operation 508 outputs the inventory usage projections and/or trends. In one implementation, the outputting operation displays the projections and/or trends on a user interface.

Figure 6:
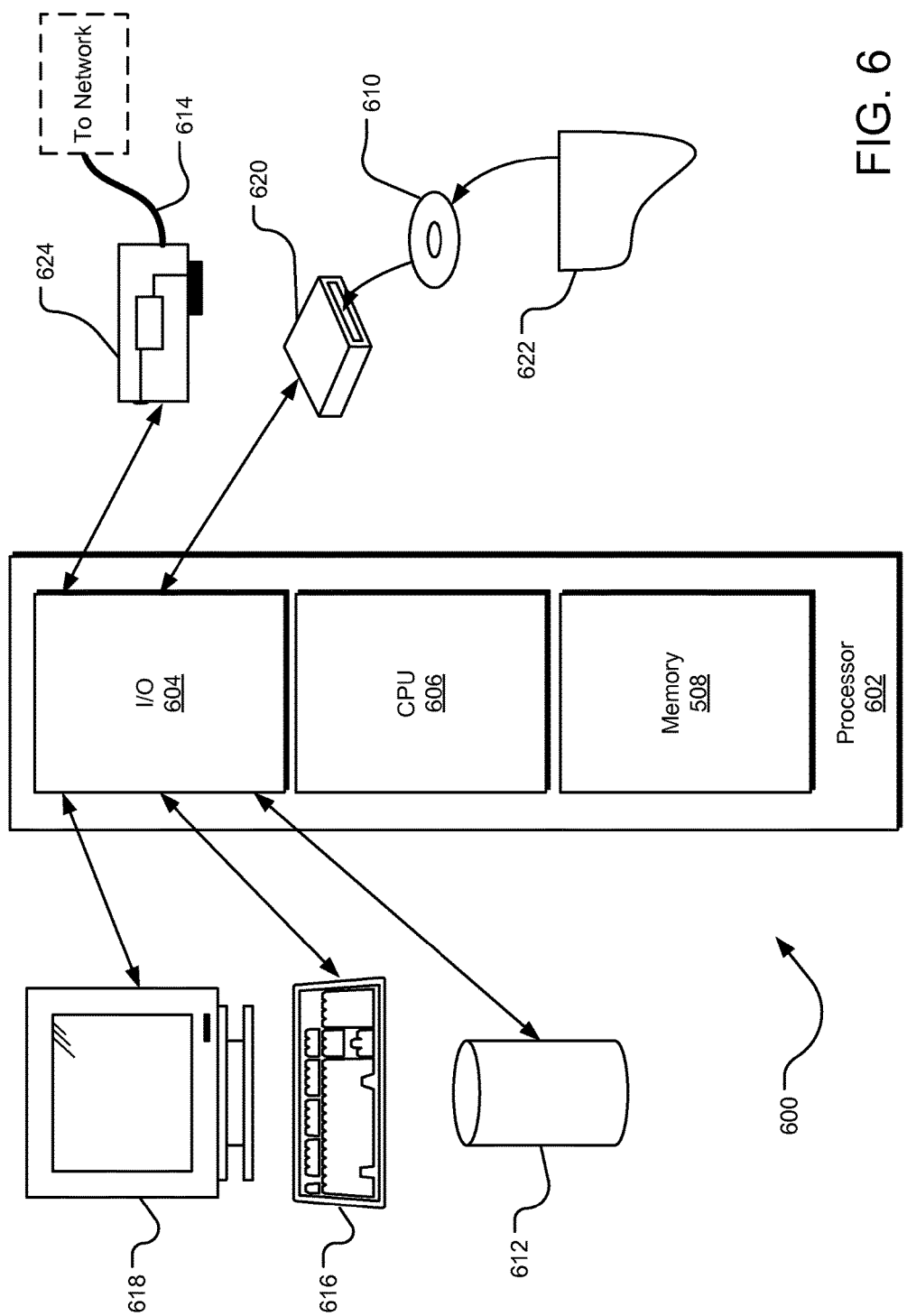
FIG. 6 is an example computing system that may implement various systems and methods discussed herein.

Referring to FIG. 6, a general purpose computer system 600 is capable of executing a computer program product to execute a computer process. Data and program files may be input to the computer system 600, which reads the files and executes the programs therein. Some of the elements of the general purpose computer system 600 are shown in FIG. 6, wherein a processor 602 is shown having an input/output (I/O) section 604, a Central Processing Unit (CPU) 606, and memory 608.

There may be one or more processors 602, such that the processor 602 of the computer system 600 comprises the CPU 606 or a plurality of processing units, commonly referred to as a parallel processing environment. The computer system 600 may be a conventional computer, a distributed computer, or any other type of computer, such as one or more external computers made available via a network architecture, for example as described with respect to FIG. 5. The presently described technology is optionally implemented in software devices loaded in the memory 608, stored on a configured DVD/CD-ROM 610 or a storage unit 612, and/or communicated via a wired or wireless network link 614 on a carrier signal, thereby transforming the computer system 600 in FIG. 6 to a special purpose machine for implementing the operations described herein.

The I/O section 604 is connected to one or more user-interface devices (e.g., a keyboard 616 and a display unit 618), the storage unit 612, and a disk drive 620. In one implementation, the disk drive 620 is a DVD/CD-ROM drive unit capable of reading the DVD/CD-ROM 610, which typically contains programs and data 622. In another implementation, the disk drive 620 is a solid state drive unit.

Computer program products containing mechanisms to effectuate the systems and methods in accordance with the presently described technology may reside in the memory 604, on the storage unit 612, on the DVD/CD-ROM 610 of the computer system 600, or on external storage devices made available via a network architecture with such computer program products, including one or more database management products, web server products, application server products, and/or other additional software components. Alternatively, the disk drive 620 may be replaced or supplemented by a floppy drive unit, a tape drive unit, or other storage medium drive unit. The network adapter 624 is capable of connecting the computer system 600 to a network via the network link 614, through which the computer system 600 can receive instructions and data embodied in a carrier wave. An example of such systems is personal computers. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are examples of communications devices for and other means of establishing a communications link between the computers may be used.

In an example implementation, inventory usage management software and other modules and services may be embodied by instructions stored on such storage systems and executed by the processor 602. Some or all of the operations described herein may be performed by the processor 602. Further, local computing systems, remote data sources and/or services, and other associated logic represent firmware, hardware, and/or software configured to control data access. Such services may be implemented using a general purpose computer and specialized software (such as a server executing service software), a special purpose computing system and specialized software (such as a mobile device or network appliance executing service software), or other computing configurations. In addition, one or more functionalities of the systems and methods disclosed herein may be generated by the processor 602 and a user may interact with a Graphical User Interface (GUI) using one or more user-interface devices (e.g., the keyboard 616, the display unit 618, and the user devices 604) with some of the data in use directly coming from online sources and data stores.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology.

What is claimed is:

1. A method comprising:
receiving a first data sample from a computing device, the first data sample having a first input time;
extracting raw usage data from the first data sample, the raw usage data specifying a total amount of licenses in a license inventory having one or more license types;
categorizing the total amount of licenses for each of the license types into an amount of used licenses and an amount of available licenses;
generating a projected license usage for each of the license types using a processor based on the categorized total amount of licenses, the projected license usage defining an availability status of each of the license types;
causing a display of the projected license usage; and
generating an electronic alert when the projected license usage indicates that an estimated time until the total amount of licenses for each of the license types is exhausted falls below a threshold.

2. The method of claim 1, wherein the license types of the license inventory include at least one of: software licenses; telecommunications service licenses; telecommunications feature licenses; system licenses; network licenses; computing licenses; subscriber licenses; or service licenses.

3. The method of claim 1, wherein the computing device is at least one of: one or more network switches; one or more routers; or a device executing vendor software.

4. The method of claim 1, wherein the projected license usage includes a percentage used generated based on a ratio of the amount of used licenses to the total amount of licenses.

5. The method of claim 1, wherein the raw usage data is further extracted from a received second data sample having a second input time.

6. The method of claim 5, wherein the projected license usage includes an average period unit usage generated based on a ratio of a difference between a past usage and a current usage to a time elapsed between the first and second input times, the past usage determined based on the amount of used licenses between the first and second input times, the current usage determined based on the amount of used licenses corresponding to the second input time.

7. The method of claim 6, wherein the projected license usage includes the projected exhaustion time representing an estimated time until the total amount of licenses for each of the license types is exhausted, the projected exhaustion time generated based on a ratio of the amount of available licenses to the average period unit usage.

8. The method of claim 7, wherein the projected license usage includes an estimated unit purchases needed generated based on the projected exhaustion time and the average period unit usage.

9. The method of claim 5, wherein the projected license usage includes license usage trends determined based on the total amount of and the amount of used over a time interval from the first input time to the second input time.

10. The method of claim 1, further comprising:
generating an alert if the projected license usage falls outside a usage projection threshold.

11. The method of claim 10, wherein the usage projection threshold includes a percentage used threshold and the projected license usage includes a percentage used generated based on a ratio of the amount of used licenses to the total amount of licenses, the alert being generated where the percentage used exceeds the percentage used threshold.

12. One or more non-transitory tangible computer-readable storage media storing computer-executable instructions for performing a computer process on a computing system, the computer process comprising:
receiving a first data sample from a computing device, the first data sample having a first input time;
extracting raw usage data from the first data sample, the raw usage data specifying a total amount of licenses in a license inventory having one or more license types;
categorizing the total amount of licenses for each of the license types into an amount of used licenses and an amount of available licenses;
generating a projected license usage for each of the license types based on the categorized total amount of licenses, the projected license usage defining an availability status of each of the license types;
causing a display of the projected license usage; and
generating an electronic alert when the projected license usage indicates that an estimated time until the total amount of licenses for each of the license types is exhausted falls below a threshold.

13. The one or more non-transitory tangible computer-readable storage media of claim 12, wherein the raw usage data is further extracted from a second data sample having a second input time, the projected license usage including an average period unit usage generated based on a ratio of a difference between a past usage and a current usage to a time elapsed between the first and second input times, the past usage determined based on the amount of used licenses between the first and second input times, the current usage determined based on the amount of used licenses corresponding to the second input time.

14. A system comprising:
at least one processor;
a display, operatively connected to the at least one processor;
memory, operatively connected to the at least one processor and storing instructions that, when executed by the at least one processor, cause the system to:
generate a projected license usage defining an availability status of a license inventory having one or more license types, the projected license usage generated based on a categorized total amount of licenses included in raw usage data extracted from one or more received data samples each having an input time, the total amount of licenses for each of the license types categorized into an amount of used licenses and an amount of available licenses;
display the projected license usage on the display; and
generate an electronic alert when the projected license usage indicates that an estimated time until the total amount of licenses for each of the license types is exhausted falls below a threshold.

15. The system of claim 14, wherein the one or more data samples are received from at least one of: one or more network switches; one or more routers; or vendor software.

* * * * *